US012706522B2

(12) United States Patent
Watanabe et al.

(10) Patent No.: US 12,706,522 B2
(45) Date of Patent: Aug. 11, 2026

(54) ELECTRONIC CIRCUITRY, ELECTRIC POWER CONVERSION DEVICE, AND INVERTER

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Hiroki Watanabe, Tokyo (JP); Takeshi Ueno, Kawasaki (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 393 days.

(21) Appl. No.: 18/184,956

(22) Filed: Mar. 16, 2023

(65) Prior Publication Data

US 2024/0097554 A1 Mar. 21, 2024

(30) Foreign Application Priority Data

Sep. 16, 2022 (JP) ................................ 2022-148549

(51) Int. Cl.

*H02M 1/08* (2006.01)
*H02M 7/5387* (2007.01)
*H02P 27/08* (2006.01)

(52) U.S. Cl.

CPC ......... *H02M 1/08* (2013.01); *H02M 7/53871* (2013.01); *H02P 27/08* (2013.01)

(58) Field of Classification Search

CPC .. H02M 1/08; H02M 7/53871; H02M 1/0048; H02M 1/14; H02M 1/084;

(Continued)

(56) References Cited

U.S. PATENT DOCUMENTS 8,350,601 B2 1/2013 Nagata et al.
10,333,509 B2 6/2019 Kaeriyama (Continued)

FOREIGN PATENT DOCUMENTS

CN 107528452 A 12/2017
CN 112005484 A 11/2020

(Continued)

OTHER PUBLICATIONS

Translation version of CN115498855A (Year: 2022).*

(Continued)

*Primary Examiner* — Monica Lewis

(74) *Attorney, Agent, or Firm* — Foley & Lardner LLP

(57) ABSTRACT

In one embodiment, electronic circuitry includes a current output circuit configured to output a drive current to a switching element, a first detection circuit configured to detect a timing at which a voltage between output terminals of the switching element, and a control circuit configured to cause the current output circuit to start outputting a first drive current in accordance with a command signal that instructs switching operation of the switching element. The control circuit switches the drive current output from the current output circuit to a second drive current smaller than the first drive current based on the timing at which the voltage between the output terminals, the timing being detected by the first detection circuit.

12 Claims, 7 Drawing Sheets

(58) Field of Classification Search
CPC ............. H02M 1/1088; H02M 7/5387; H02M 7/5395; H02M 1/44; H02M 1/38; H02M 1/32; H02P 27/08; H02P 7/28; H03K 17/689
See application file for complete search history.

(56) References Cited

U.S. PATENT DOCUMENTS

| | | | | |
|---|---|---|---|---|
| 10,554,202 | B2 | 2/2020 | Nomura | |
| 10,749,519 | B2 | 8/2020 | Wada | |
| 10,892,749 | B2 | 1/2021 | Kawai | |
| 11,621,626 | B2 | 4/2023 | Igarashi | |
| 11,791,712 | B2 | 10/2023 | Amimoto et al. | |
| 11,831,302 | B2 | 11/2023 | Nakamura et al. | |
| 11,894,837 | B2 | 2/2024 | Matsubara | |
| 2013/0155740 | A1 | 6/2013 | Takubo | |
| 2018/0269869 | A1* | 9/2018 | Mukhopadhyay | H02M 1/08 |

FOREIGN PATENT DOCUMENTS

| | | | | |
|---|---|---|---|---|
| CN | 115498855 A * | 12/2022 | | H02M 1/08 |
| EP | 4535634 A1 * | 4/2025 | | H02M 1/08 |
| JP | 2007-159224 A | 6/2007 | | |
| JP | 2011-120418 A | 6/2011 | | |
| JP | 2017-229151 A | 12/2017 | | |
| JP | 2018-038174 A | 3/2018 | | |
| JP | 2018-153006 A | 9/2018 | | |
| JP | 2020-145560 A | 9/2020 | | |
| JP | 2020-205668 A | 12/2020 | | |
| JP | 2021-191088 A | 12/2021 | | |
| JP | 2022-077362 A | 5/2022 | | |
| JP | 2022-092971 A | 6/2022 | | |
| WO | WO-2018/198426 A1 | 11/2018 | | |
| WO | WO-2020/261353 A1 | 12/2020 | | |
| WO | WO-2023228402 A1 * | 11/2023 | | H02M 1/08 |

OTHER PUBLICATIONS

Translation version of WO2023228402A1 (Year: 2023).*

Translation version of EP4535634A1 (Year: 2025).*

"Rise and fall time regulation with current source MOSFET gate drivers", Infineon, Application Note, Document Reference Z8F69449874, Jun. 19, 2020, pp. 1-33 (33 pages).

JP Notice of Reason for refusal for JP Appl. Ser. No. 2022-148549 mail date Jan. 30, 2026 (8 pages).

CN Office Action issued in the Chinese Patent Application No. 202310250196.9, dated Apr. 29, 2026 (15 pages).

* cited by examiner

ELECTRONIC CIRCUITRY, ELECTRIC POWER CONVERSION DEVICE, AND INVERTER

REFERENCE TO RELATED APPLICATIONS

This application is based upon and claims the benefit of priority from the prior Japanese Patent Application No. 2022-148549, filed on Sep. 16, 2022, the entire contents of which are incorporated herein by reference.

TECHNICAL FIELD

The present embodiment relates to electronic circuitry, an electric power conversion device and an inverter.

BACKGROUND ART

A semiconductor switching element such as a metal oxide semiconductor field effect transistor (MOSFET) or an insulated gate bipolar transistor (IGBT) is used in the field of power electronics.

When such a switching element is turned on, there exists a delay (switching delay) after a gate voltage starts to increase and before a drain current starts to flow. A drive current supplied before a drain-source voltage starts to change is increased to shorten the switching delay. However, when the drive current remains large after the drain-source voltage starts to change, noise might be generated by an abrupt change of the drain-source voltage.

The present embodiment is intended to solve the above-described problem and provide electronic circuitry that can shorten a switching delay while preventing a noise generation.

To solve the above-described problem, electronic circuitry according to the present embodiment comprises a current output circuit configured to output a drive current to a switching element, a first detection circuit configured to detect a timing at which a voltage between output terminals of the switching element starts to change, and a control circuit configured to cause the current output circuit to start outputting a first drive current in accordance with a command signal that instructs switching operation of the switching element. The control circuit switches the drive current output from the current output circuit to a second drive current smaller than the first drive current based on the timing at which the voltage between the output terminals starts to change, the timing being detected by the first detection circuit.

An electric power conversion device according to the present embodiment comprises two switching elements constituting an arm pair, and two electronic circuitry configured to supply drive currents to the two switching elements respectively. Each electronic circuitry comprises a current output circuit configured to output a drive current to a switching element, a first detection circuit configured to detect a timing at which a voltage between output terminals of the switching element starts to change, and a control circuit configured to cause the current output circuit to start outputting a first drive current in accordance with a command signal that instructs switching operation of the switching element. The control circuit switches the drive current output from the current output circuit to a second drive current smaller than the first drive current based on the timing at which the voltage between the output terminals starts to change, the timing being detected by the first detection circuit.

An inverter according to the present embodiment comprises a motor and an electric power conversion circuit including three sets of two switching elements and two electronic circuitries, the two switching elements constituting an arm pair connected to the motor, the two electronic circuitry being configured to supply a drive current to the two switching elements respectively. Each electronic circuitry comprises a current output circuit configured to output a drive current to a switching element, a first detection circuit configured to detect a timing at which the voltage between output terminals of the switching element starts to change, and a control circuit configured to cause the current output circuit to start outputting a first drive current in accordance with a command signal that instructs switching operation of the switching element. The control circuit switches the drive current output from the current output circuit to a second drive current smaller than the first drive current based on the timing at which the voltage between the output terminals starts to change, the timing being detected by the first detection circuit.

DETAILED DESCRIPTION

Figure 1:
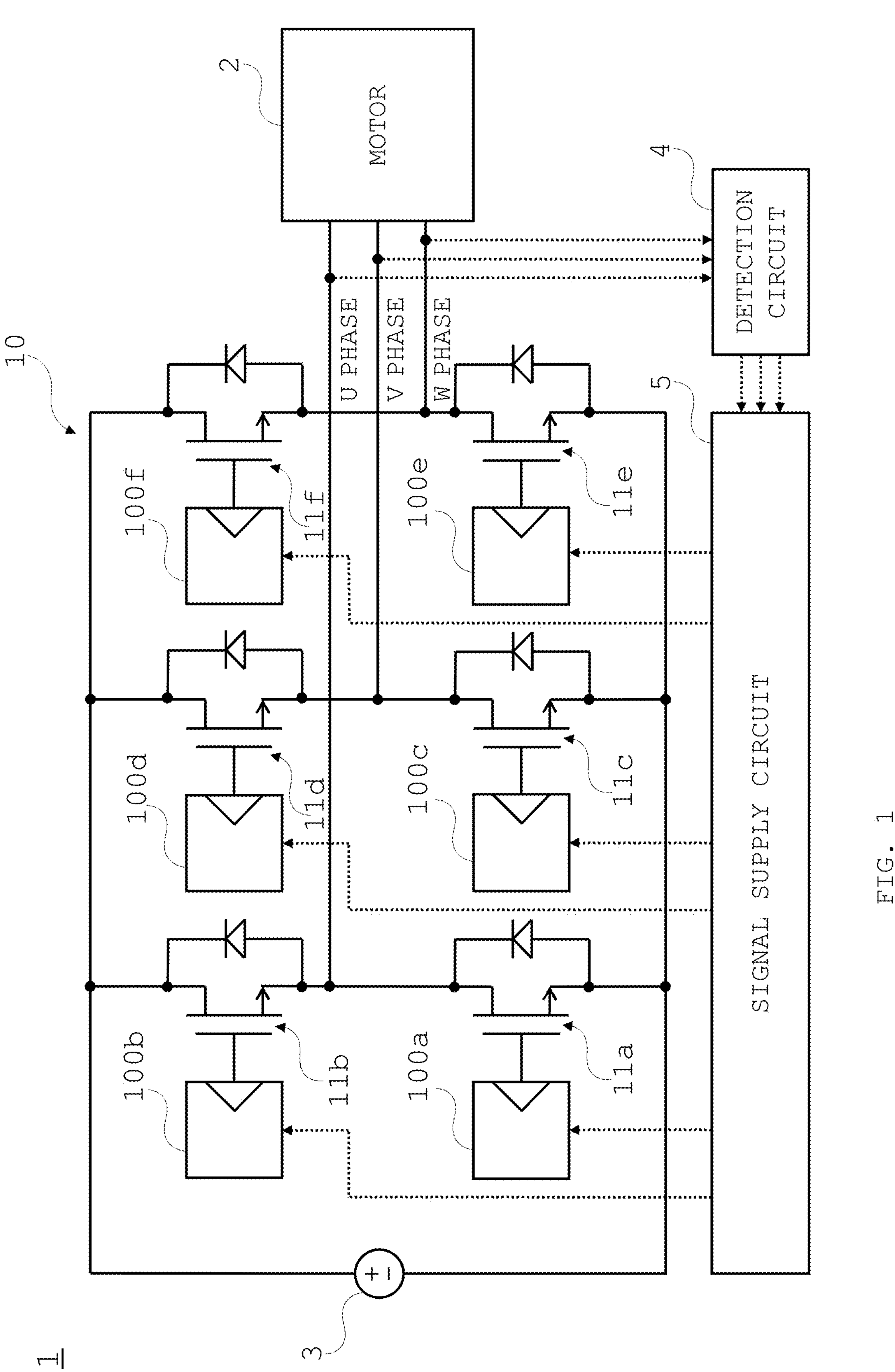
FIG. 1 illustrates a configuration of a motor control system according to Embodiment 1.

Embodiments will be described below with reference to the accompanying drawings. Any identical or corresponding elements in the drawings are denoted by the same reference, and detailed description thereof is appropriately omitted.

Embodiment 1

FIG. 1 illustrates a configuration of a motor control system 1 according to Embodiment 1. The motor control system 1 comprises a three-phase alternating-current motor 2 as a load, a direct-current power source 3, switching elements 11*a* to 11*f* constituting a three-phase inverter circuit 10 and electronic circuitry 100*a* to 100*f* configured to drive the switching elements 11*a* to 11*f* respectively. The motor control system 1 also comprises a detection circuit 4 configured to detect operation states of the switching elements 11*a* to 11*f* and a signal supply circuit 5 configured to supply PWM signals to electronic circuitry 100*a* to 100*f*. The motor 2 is the load as an example in the present embodiment. However, an any optional electronic device or electrical device driven by an alternating-current power source may be the load in the present embodiment.

The switching elements 11*a* and 11*b* are N-channel MOSFETs. The switching elements 11*a* and 11*b* constitute a U-phase arm pair of the inverter circuit 10. Electronic circuitry 100*a* controls switching operation of the switching element 11*a*. Specifically, electronic circuitry 100*a* controls turn-on and turn-off of the switching element 11*a*, by controlling a drive current (i.e., gate current Ig) of the switching element 11*a*. Electronic circuitry 100*b* controls switching operation of the switching element 11*b* by controlling a drive current of the switching element 11*b*.

Similarly, the switching elements 11*c* and 11*d* are N-channel MOSFETs. The switching elements 11*c* and 11*d* constitute a V-phase arm pair of the inverter circuit 10. Electronic circuitry 100*c* controls switching operation of the switching element 11*c* by controlling a drive current of the switching element 11*c*. Electronic circuit 100*d* controls switching operation of the switching element 11*d* by controlling a drive current of the switching element 11*d*.

Similarly, the switching elements 11*e* and 11*f* are N-channel MOSFETs. The switching elements 11*e* and 11*f* constitute a W-phase arm pair of the inverter circuit 10. Electronic circuitry 100*e* controls switching operation of the switching element 11*e* by controlling a drive current Ig of the switching element 11*e*. Electronic circuitry 100*f* controls switching operation of the switching element 11*f* by controlling a drive current of the switching element 11*f*.

The detection circuit 4 detects the operation states of the switching elements 11*a* to 11*f* based on the U-phase, V-phase and W-phase current values of the motor 2 and transmits results of the detection to the signal supply circuit 5. Alternatively, the detection circuit 4 may detect the operation states of the switching elements 11*a* to 11*f* based on temperature acquired by a non-illustrated temperature sensor built in the motor 2. Alternatively, the detection circuit 4 may detect the operation states of the switching elements 11*a* to 11*f* based on signals received from a non-illustrated control microcomputer.

The signal supply circuit 5 supplies PWM signals as command signals, which instruct switching operation of the switching elements 11*a* to 11*f*, to electronic circuitry 100*a* to 100*f* based on the operation states of the switching elements 11*a* to 11*f* received from the detection circuit 4. The signal supply circuit 5 and electronic circuitry 100*a* to 100*f* operate in accordance with a non-illustrated system clock.

Figure 2:
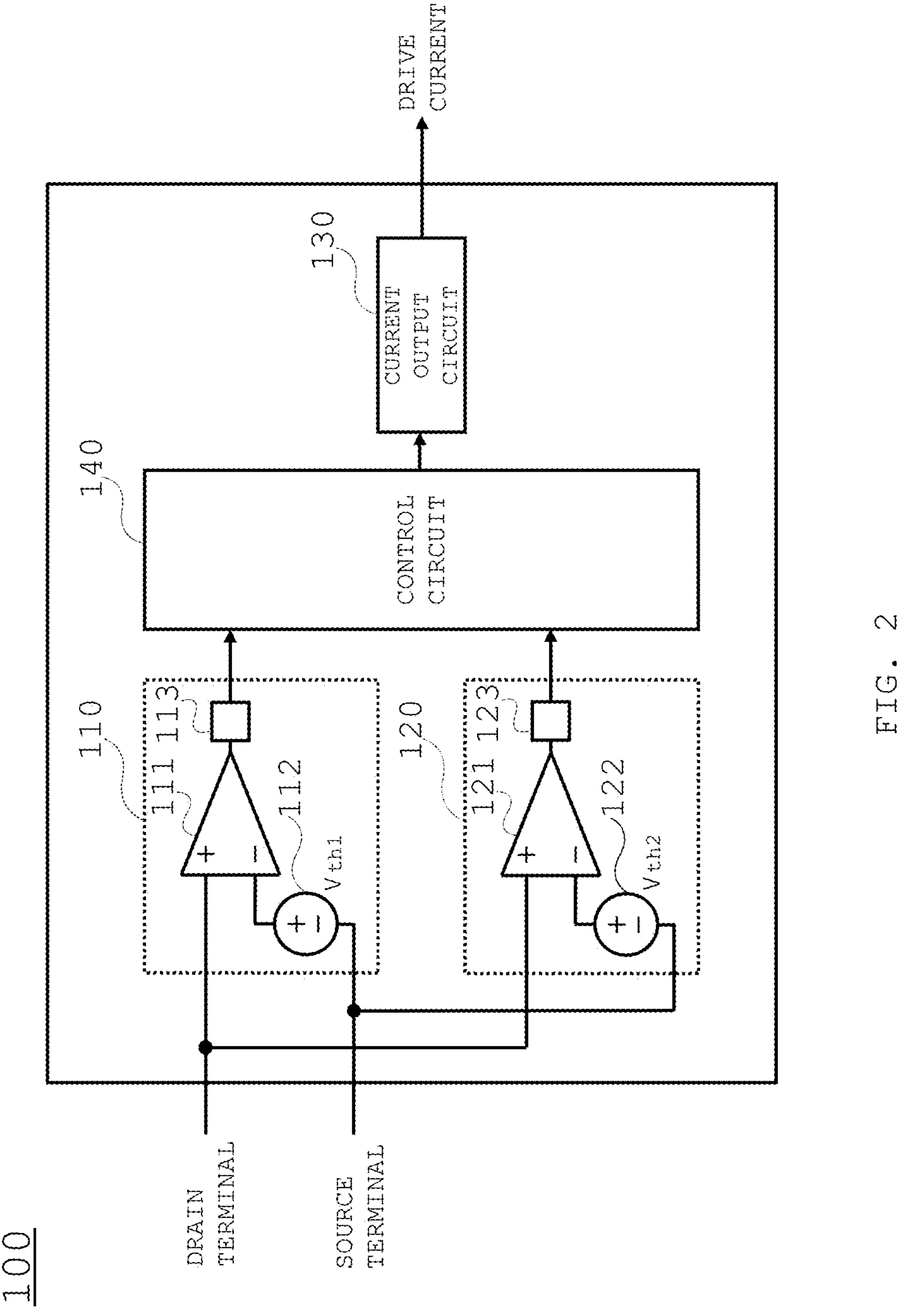
FIG. 2 illustrates an internal configuration of electronic circuitry of Embodiment 1.

FIG. 2 illustrates an internal configuration of electronic circuitry 100*a* to 100*f*. Since electronic circuitry 100*a* to 100*f* have identical configurations, hereinafter they are collectively referred to as electronic circuitry 100. Similarly, the switching elements 11*a* to 11*f* are collectively referred to as a switching element 11.

Electronic circuitry 100 is configured to supply a drive current to the switching element 11 and includes a first detection circuit 110, a second detection circuit 120, a current output circuit 130 and a control circuit 140.

The first detection circuit 110 detects a timing at which the voltage between the output terminals of the switching element 11 starts to change, i.e., the timing at which the drain-source voltage Vds starts to change during turn-on. Specifically, the first detection circuit 110 detects the timing at which the voltage between the output terminals of the switching element 11 starts to change, by detecting the timing at which the drain-source voltage Vds of the switching element 11 becomes equal to a predetermined first threshold voltage Vth1. In Embodiment 1, as an example, the first threshold voltage Vth1 is set between 90% to 80% of the drain-source voltage Vds when the switching element 11 is OFF.

The first detection circuit 110 includes a comparator 111, a constant-voltage source 112 configured to output a first threshold voltage Vth1 and a detection-signal output circuit 113. The positive terminal of the comparator 111 is connected to the drain terminal of the switching element 11. The negative terminal of the comparator 111 is connected to the source terminal of the switching element 11 through the constant-voltage source 112. When the output voltage of the comparator 111 becomes zero, i.e., when the drain-source voltage Vds of the switching element 11 becomes equal to the first threshold voltage Vth1, the detection-signal output circuit 113 transmits a detection signal to the control circuit 140.

The second detection circuit 120 detects a timing at which the voltage between the output terminals of the switching element 11 has stopped changing, i.e., the timing at which the drain-source voltage Vds decreases to a predetermined value or lower during turn-on. Specifically, the second detection circuit 120 detects the timing at which the voltage between the output terminals of the switching element 11 has stopped changing, by detecting the timing at which the drain-source voltage Vds of the switching element 11 becomes equal to a predetermined second threshold voltage Vth2. In Embodiment 1, as an example, the second threshold voltage Vth2 is set between 20% to 10% of the drain-source voltage Vds when the switching element 11 is OFF.

The second detection circuit 120 includes a comparator 121, a constant-voltage source 122 configured to output a second threshold voltage Vth2 and a detection-signal output circuit 123. The positive terminal of the comparator 121 is connected to the drain terminal of the switching element 11. The negative terminal of the comparator 121 is connected to the source terminal of the switching element 11 through the constant-voltage source 122. When the output voltage of the comparator 121 becomes zero, i.e., when the drain-source voltage Vds of the switching element 11 becomes equal to the second threshold voltage Vth2, the detection-signal output circuit 123 transmits a detection signal to the control circuit 140.

The current output circuit 130 outputs a drive current to the switching element 11. The control circuit 140 causes the current output circuit 130 to start outputting a first drive current Ig1 in accordance with a rising edge of the PWM signal supplied from the signal supply circuit 5, and then controls the magnitude of the drive current output from current output circuit 130 based on the timing at which the voltage between the output terminals of the switching element 11 starts to change (which is detected by the first detection circuit 110) and the timing at which the voltage between the output terminals of the switching element 11 has stopped changing (which is detected by the second detection circuit 120).

The control circuit 140 is implemented by at least one processor. The processor includes computation circuit, etc., and is configured, for example, to perform analog signal processing or digital signal processing. The processor may be a central processing unit (CPU), a digital signal processor (DSP), a general-purpose processor, a microprocessor, an ASIC, an FPGA, a semiconductor chip, a discrete component, or a combination thereof.

Figure 3:
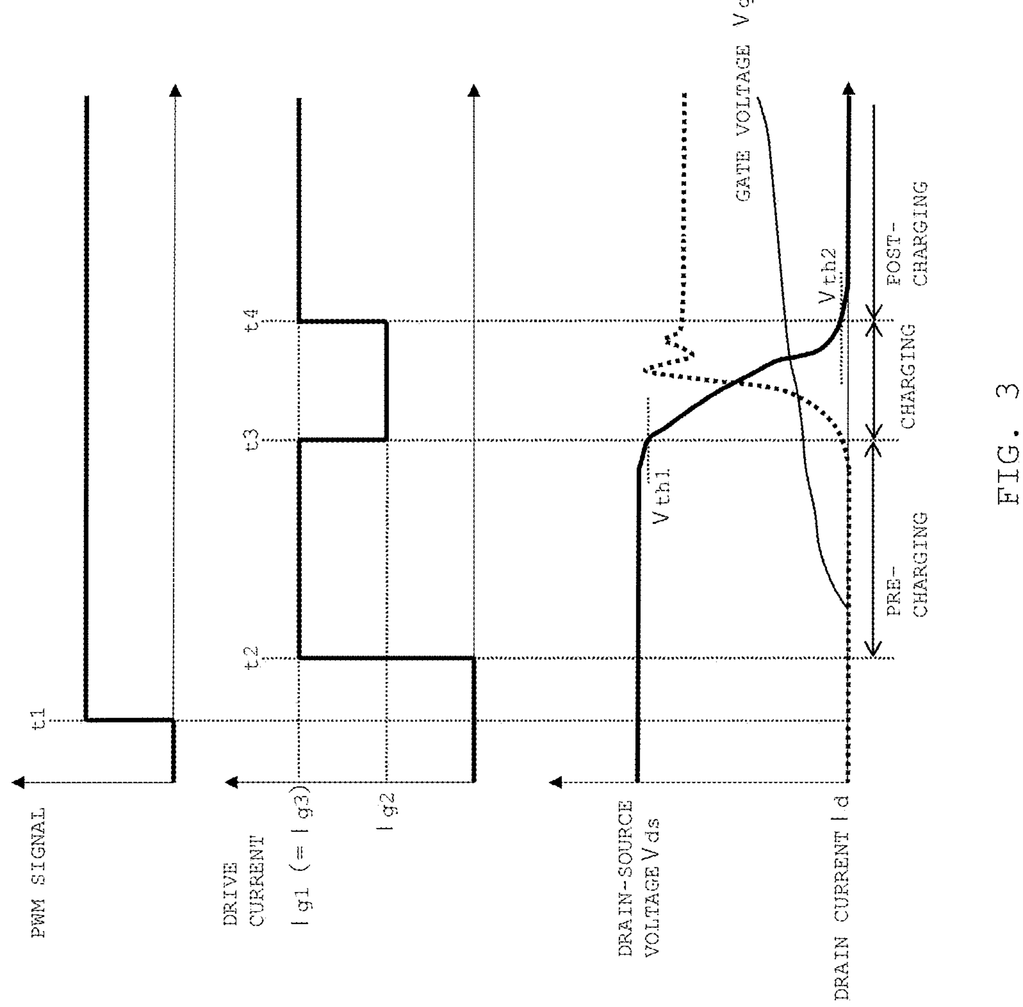
FIG. 3 is a timing chart for explaining a drive current output from a current output circuit according to Embodiment 1 and operation of a switching element driven by the drive current.

FIG. 3 is a timing chart for explaining a drive current output from the current output circuit 130 and operation of the switching element 11 driven by the drive current.

When an rising edge of the PWM signal is detected at time t1, the control circuit 140 causes the current output circuit 130 to start outputting the first drive current Ig1 and starts "pre-charging" of the switching element 11 (time t2).

The duration of time t1 to time t2 corresponds to a delay time from when the control circuit 140 detects the rising edge of the PWM signal to when the first drive current Ig1 is actually output from the current output circuit 130.

The time period from when the gate voltage Vg of the switching element 11 starts increasing to when the drain-source voltage Vds starts to change, (i.e., switching delay) can be shortened as the first drive current Ig1 is larger. Thus, the first drive current Ig1 is preferably set to be as large as possible.

The switching delay can also be shortened as the duration in which the first drive current Ig1 is supplied is longer. However, if the drive current remains large after the drain-source voltage Vds starts to change, noise might be generated by an abrupt change of the drain-source voltage Vds. Thus, the first drive current Ig1 is preferably supplied until just before the drain-source voltage Vds starts to change, i.e., just before the voltage between the output terminals of the switching element 11 starts to change.

At time t3, the first detection circuit 110 detects that the voltage between the output terminals of the switching element 11 starts to change, i.e., the drain-source voltage Vds of the switching element 11 has become equal to the first threshold voltage Vth1. The control circuit 140 switches the drive current output from the current output circuit 130 from the first drive current Ig1 to a second drive current Ig2 and starts "charging" of the switching element 11.

The time period from when the voltage between the output terminals of the switching element 11 starts to change to when it has stopped changing depends on the magnitude of the second drive current Ig2. Specifically, the time period from when the voltage starts to change to when it has stopped changing can be shortened as the second drive current Ig2 is larger. However, if the second drive current Ig2 is too large, noise might be generated by an abrupt change of the drain-source voltage Vds. Thus, the second drive current Ig2 is preferably set to be smaller than the first drive current Ig1 and as large as possible in a range in which noise is not generated.

At time t4, the second detection circuit 120 detects that the voltage between the output terminals of the switching element 11 has stopped changing, i.e., the drain-source voltage Vds of the switching element 11 has become equal to the second threshold voltage Vth2. The control circuit 140 switches the drive current output from the current output circuit 130 from the second drive current Ig2 to a third drive current Ig3 and starts "post-charging" of the switching element 11.

The length of the duration of post-charging depends on the magnitude of the third drive current Ig3. Specifically, the duration of post-charging can be shortened as the third drive current Ig3 is larger. In the duration of post-charging, the switching element 11 is already ON and thus noise generation does not need to be considered. Thus, the magnitude of the third drive current Ig3 is preferably set to be larger than the magnitude of the second drive current Ig2 and preferably set to be as large as possible like the first drive current Ig1. In Embodiment 1, as an example, the magnitude of the third drive current Ig3 is set to be equal to the magnitude of the first drive current Ig1.

As described above, the control circuit 140 of electronic circuitry 100 according to Embodiment 1 causes the current output circuit 130 to start outputting the first drive current Ig1 in accordance with the rising edge of the PWM signal, and then switches the drive current output from the current output circuit 130 to the second drive current Ig2 when the timing at which the voltage between the output terminals of the switching element 11 starts to change is detected by the first detection circuit 110.

With the above-described features, it is possible to shorten the switching delay while preventing the noise generation when supplying the drive current to the switching element in electronic circuitry 100 according to Embodiment 1. In "Rise and fall time regulation with current source MOSFET gate drivers", Infineon Application Note Z8F69449874, Jun. 19, 2020, the duration of pre-charging is fixed, and thus it is impossible to extend, sufficiently enough to allow variance in characteristics of the switching element and electronic circuitry, the duration of pre-charging to just before the timing at which the voltage between the output terminals of the switching element starts to change. However, in Embodiment 1, it is possible to extend the duration of pre-charging to just before the timing at which the voltage between the output terminals of the switching element starts to change, by detecting the timing at which the voltage between the output terminals of the switching element starts to change.

Figure 4:
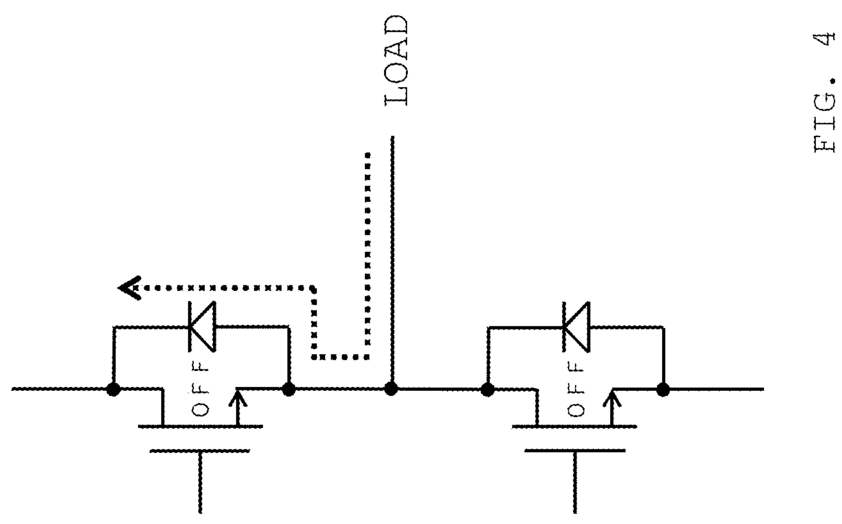
FIG. 4 illustrates an example of a current flowing from a load side when two switching elements constituting an arm pair are both OFF.

As illustrated in FIG. 4, when two switching elements constituting an arm pair are both OFF, a current from the load side flows through a parasitic diode of the switching element. In this case, conduction loss occurs at the parasitic diode. However, in Embodiment 1, since the switching delay of the switching element is shortened, the duration in which the two switching elements are both OFF is short and the conduction loss at the parasitic diode is reduced.

Moreover, since the switching delay of the switching element is shortened, an ON-OFF following capability of the switching element for ON-OFF change of the PWM signal is improved. Accordingly, the motor or the like is more efficiently controlled.

The control circuit 140 of electronic circuitry 100 according to Embodiment 1 switches the drive current output from the current output circuit 130 to the third drive current Ig3 which is larger than the second drive current Ig2, when the timing at which the voltage between the output terminals of the switching element 11 has stopped changing is detected by the second detection circuit 120 during the second drive current Ig2 is output. With such a feature, the duration of post-charging is shortened in electronic circuitry 100 according to Embodiment 1.

The first detection circuit 110 of electronic circuitry 100 according to Embodiment 1 detects the timing at which the voltage between the output terminals of the switching element 11 starts to change by detecting the timing at which the drain-source voltage Vds of the switching element 11 becomes equal to the predetermined first threshold voltage Vth1. Similarly, the second detection circuit 120 of electronic circuitry 100 according to Embodiment 1 detects the timing at which the voltage between the output terminals of the switching element 11 starts to change by detecting the timing at which the drain-source voltage Vds of the switching element 11 becomes equal to the predetermined second threshold voltage Vth2. With such features, electronic circuitry 100 according to Embodiment 1 can easily and accurately detect the timings at which the voltage between the output terminals of the switching element 11 starts to change and has stopped changing.

Embodiment 2

Electronic circuitry 200 according to Embodiment 2 will be described below. In electronic circuitry 100 according to Embodiment 1, the drive current is switched when the timing at which the voltage between the output terminals of the switching element 11 starts to change or has stopped changing is detected. However, switching of the drive current at the timing at which the voltage between the output terminals of the switching element starts to change or has stopped changing might be too late, depending on the operation speeds of electronic circuitry and the switching element.

In electronic circuitry 200 according to Embodiment 2, it is possible to reliably switch the drive current at the timing at which the voltage between the output terminals of the switching element starts to change or has stooped changing, without depending on the operation speeds of electronic circuitry and the switching element.

Figure 5:
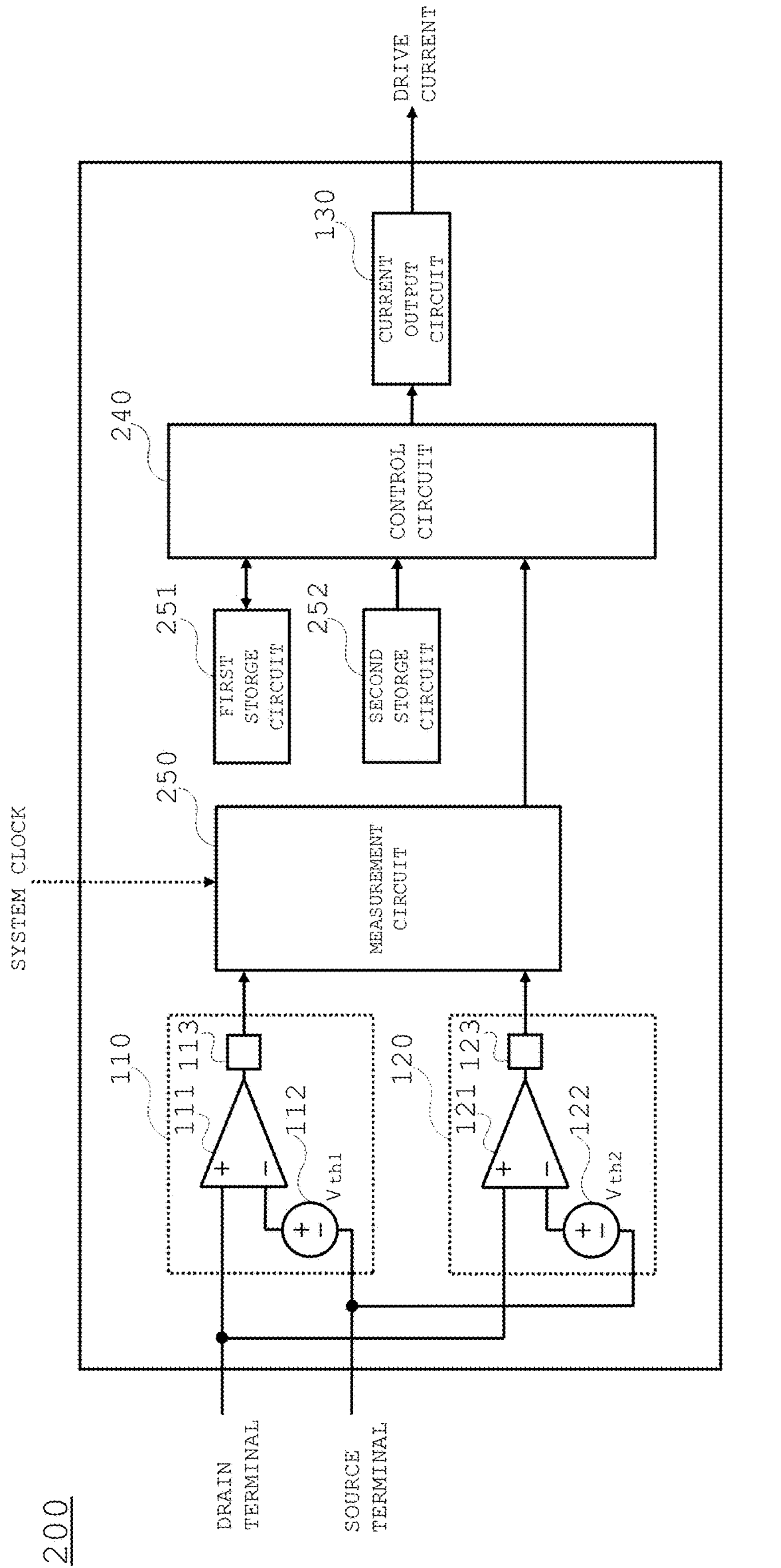
FIG. 5 illustrates an internal configuration of electronic circuitry of Embodiment 2.

FIG. 5 illustrates an internal configuration of electronic circuitry 200 according to Embodiment 2. Electronic circuitry 200 comprises a measurement circuit 250, a first storage circuit 251 and a second storage circuit 252 in addition to the components of electronic circuitry 100 according to Embodiment 1. Electronic circuitry 200 also comprises a control circuit 240 instead of the control circuit 140.

The measurement circuit 250 measures a third time period T3 from when the timing at which the voltage between the output terminals of the switching element 11 starts to change is detected by the first detection circuit 110 to when the timing at which the voltage between the output terminals of the switching element 11 has stopped changing is detected by the second detection circuit 120. Specifically, the measurement circuit 250 measures the third time period T3 based on the number of system clocks counted after the timing at which the voltage between the output terminals is detected by the first detection circuit 110 and before the timing at which the voltage between the output terminals is detected by the second detection circuit 120.

A first time period T1, in which the first drive current Ig1 is supplied from the current output circuit 130, is stored in the first storage circuit 251. A second time period T2, in which the second drive current Ig2 is supplied from the current output circuit 130, is stored in the second storage circuit 252. In Embodiment 2, the second time period T2 is a fixed value that is preliminary determined.

The control circuit 240 causes the current output circuit 130 to start outputting the first drive current Ig1 in accordance with a rising edge of the PWM signal, and then controls the magnitude of the drive current output from the current output circuit 130 based on the first time period T1 stored in the first storage circuit 251 and the second time period T2 stored in the second storage circuit 252. In each predetermined period such as 1 ms, which is different from the period of the PWM signal, the control circuit 240 corrects the value of the first time period T1 stored in the first storage circuit 251 based on the third time period T3 measured by the measurement circuit 250.

Figure 6:
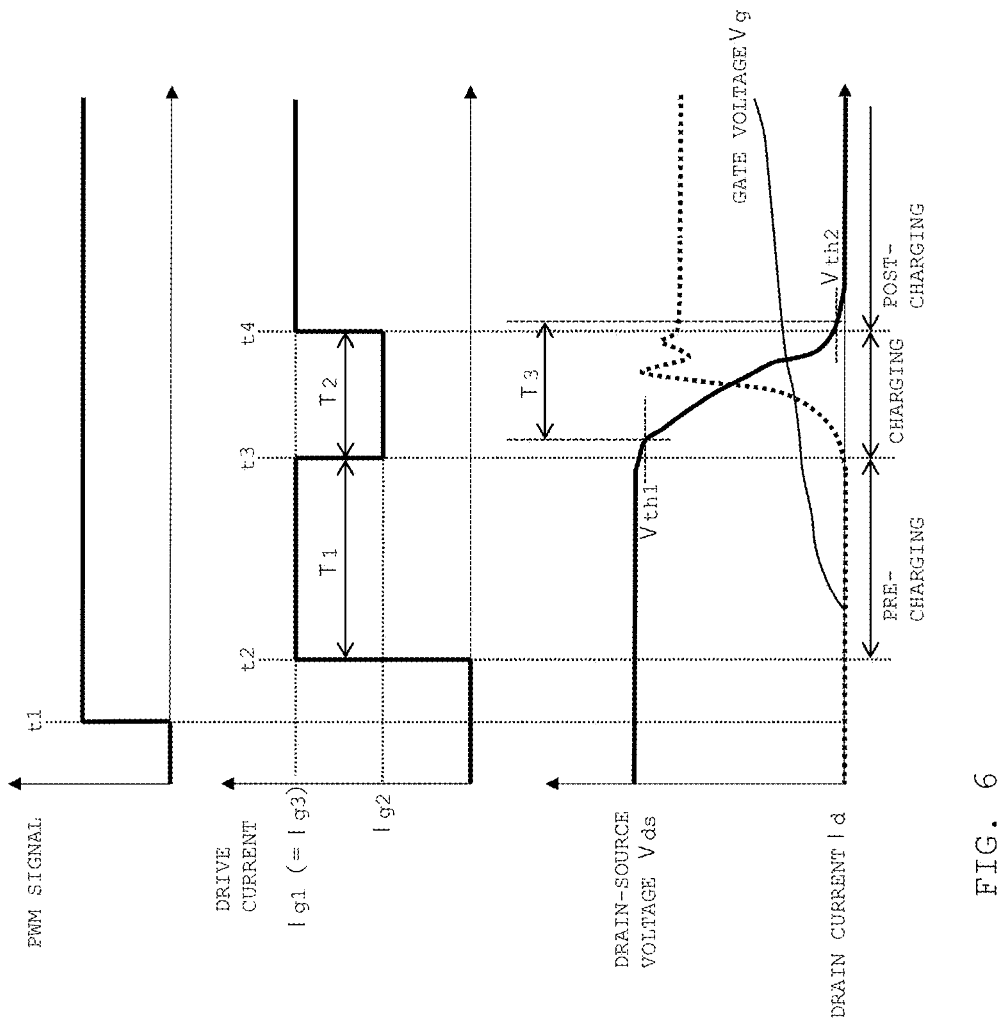
FIG. 6 is a timing chart for explaining a drive current output from a current output circuit according to Embodiment 2 and operation of a switching element driven by the drive current.

FIG. 6 is a timing chart for explaining a drive current output from the current output circuit 130 and operation of the switching element 11 driven by the drive current.

When a rising edge of the PWM signal is detected in a certain period of the PWM signal (time t1), the control circuit 240 causes the current output circuit 130 to start outputting the first drive current Ig1 (time t2).

When the first time period T1 stored in the first storage circuit 251 has passed after the current output circuit 130 starts outputting the first drive current Ig1, the control circuit 240 switches the drive current output from the current output circuit 130 from the first drive current Ig1 to the second drive current Ig2 (time t3).

When the second time period T2 stored in the second storage circuit 252 has passed after the current output circuit 130 starts outputting the second drive current Ig2, the control circuit 240 switches the drive current output from the current output circuit 130 from the second drive current Ig2 to the third drive current Ig3 (time t4).

In each predetermined period such as 1 ms, which is different from the period of the PWM signal, the measurement circuit 250 measures the third time period T3 from when the timing at which the voltage between the output terminals of the switching element 11 starts to change is detected by the first detection circuit 110 to when the timing at which the voltage between the output terminals of the switching element 11 has stopped changing is detected by the second detection circuit 120. The control circuit 240 corrects the value of the first time period T1 stored in the first storage circuit 251 based on the third time period T3 measured by the measurement circuit 250.

Specifically, when the difference between the second time period T2 and the third time period T3 is larger than zero (i.e., T2−T3>0), the timing of switching from the first drive current Ig1 to the second drive current Ig2 is earlier than the timing at which the voltage between the output terminals starts to change, because the first time period T1 in which the first drive current Ig1 is supplied is too short. In this case, the control circuit 240 extends the first time period T1 stored in the first storage circuit 251 by a predetermined time period ΔT. For example, the predetermined time period ΔT is set to the minimum value of time resolution of the measurement circuit 250.

When the difference between the second time period T2 and the third time period T3 is equal to or smaller than zero (i.e., T2−T3≤0), the timing of switching from the first drive current Ig1 to the second drive current Ig2 is later than the timing at which the voltage between the output terminals starts to change, because the first time period T1 in which the first drive current Ig1 is supplied is too long. In this case, the control circuit 240 shortens the first time period T1 stored in the first storage circuit 251 by the predetermined time period ΔT.

Subsequently, in each predetermined period such as 1 ms, which is different from the period of the PWM signal, the control circuit 240 corrects the value of the first time period T1 stored in the first storage circuit 251 based on the third time period T3 measured by the measurement circuit 250. Accordingly, the first time period T1 in which the first drive current Ig1 is output converges to an appropriate value, and the timing of switching from the first drive current Ig1 to the second drive current Ig2 becomes equals to the timing at which the voltage between the output terminals starts to change.

As described above, when the first time period T1 has passed after the current output circuit 130 starts outputting the first drive current Ig1, the control circuit 240 of electronic circuit 200 according to Embodiment 2 switches the drive current output from the current output circuit 130 from the first drive current Ig1 to the second drive current Ig2 and causes the second drive current Ig2 to be output for the second time period T2.

In each predetermined period such as 1 ms, which is different from the period of the PWM signal, the control circuit 240 corrects the value of the first time period T1 stored in the first storage circuit 251 based on the third time period T3 measured by the measurement circuit 250. Accordingly, it is possible to reliably switch the drive current at the timing at which the voltage between the output terminals of the switching element starts to change, without depending on the operation speeds of electronic circuitry and the switching element.

Embodiment 3

Electronic circuitry 300 according to Embodiment 3 will be described below. In electronic circuitry 300 according to Embodiment 3, the value of the second drive current Ig2 is corrected based on a third time period T3 from when the voltage between the output terminals of the switching element 11 starts to change to when it has stopped changing.

Figure 7:
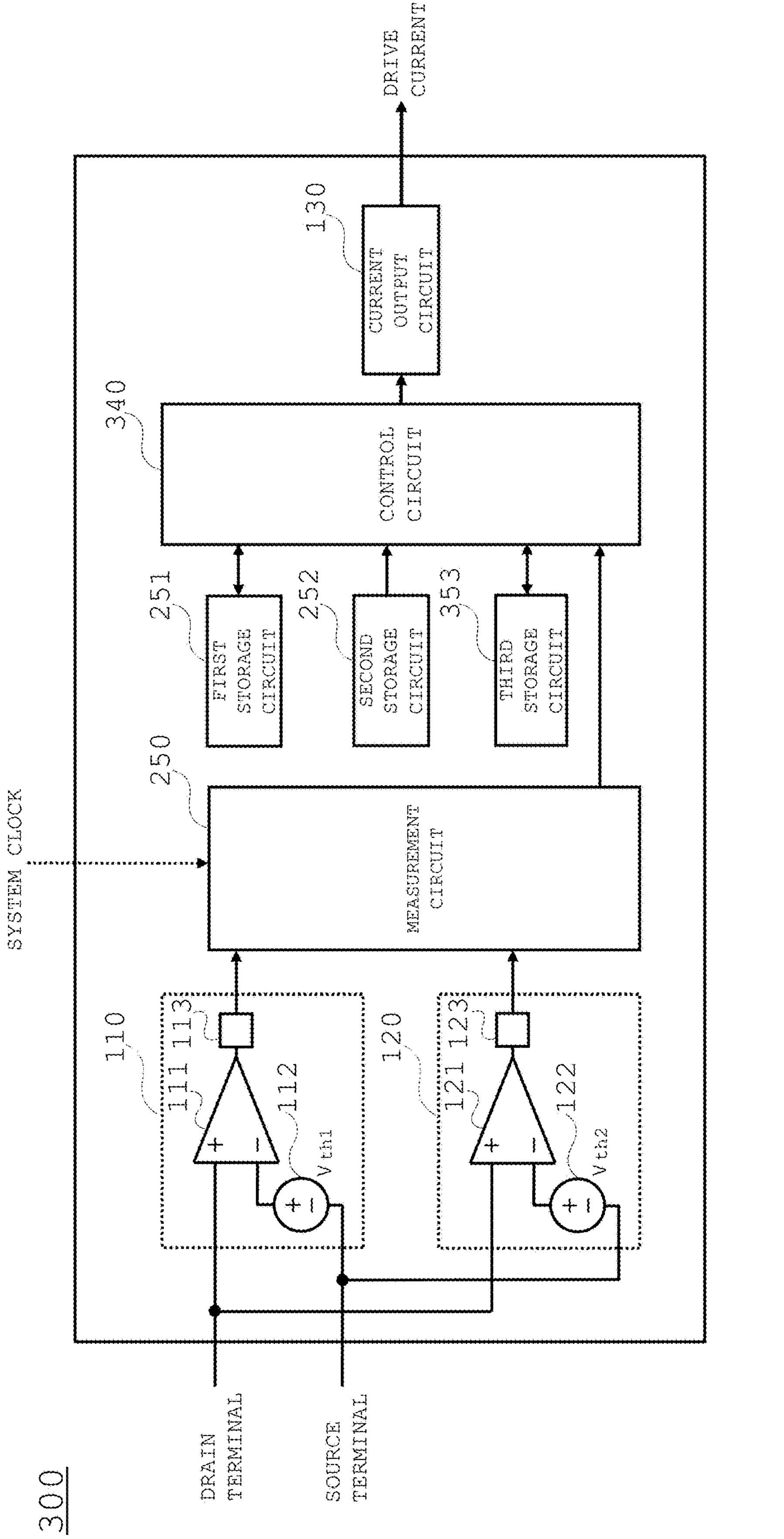
FIG. 7 illustrates an internal configuration of electronic circuitry of Embodiment 3.

FIG. 7 illustrates an internal configuration of electronic circuitry 300 according to Embodiment 3. Electronic circuitry 300 comprises a third storage circuit 353 in addition to the components of electronic circuitry 200 according to Embodiment 2. The third storage circuit 353 stores the value of the second drive current Ig2 output from the current output circuit 130. Electronic circuitry 300 also comprises the control circuit 340 instead of the control circuit 240.

Similarly to Embodiment 2, in each predetermined period such as 1 ms, which is different from the period of the PWM signal, the measurement circuit 250 measures the third time period T3 from when the timing at which the voltage between the output terminals of the switching element 11 starts to change is detected by the first detection circuit 110 to when the timing at which the voltage between the output terminals of the switching element 11 has stopped changing is detected by the second detection circuit 120. The control circuit 340 corrects the value of the second drive current Ig2 stored in the storage circuit 353 based on the third time period T3 measured by the measurement circuit 250.

Specifically, when the third time period T3 is shorter than a predetermined target time period Ttg, the control circuit 340 decreases the second drive current Ig2. When the third time period T3 is longer than the target time period Ttg, the control circuit 340 increases the second drive current Ig2.

As described above, the third time period T3 from when the voltage between the output terminals of the switching element 11 starts to change to when it has stopped changing depends on the value of the second drive current Ig2. Specifically, the third time period T3 from when the voltage between the output terminals starts to change to when it has stopped changing can be shortened as the second drive current Ig2 is larger. However, if the second drive current Ig2 is too large, noise might be generated by an abrupt change of the drain-source voltage Vds. Thus, the third time period T3 is preferably as short as possible in a range in which noise is not generated.

In Embodiment 3, it is possible to shorten the third time period T3 as much as possible in a range in which noise is not generated by experimentally or theoretically determining in advance the shortest predetermined target time period Ttg in a range in which noise is not generated. Accordingly, the time period from when the voltage between the output terminals of the switching element starts to change to when it has stopped changing is shortened as much as possible in a range in which noise is not generated.

Modifications

In Embodiments 1 to 3, the three-phase inverter circuit 10 is constituted by the switching elements 11*a* to 11*f*. Instead, for example, a converter circuit may be constituted by switching elements and diodes.

The switching elements 11*a* to 11*f* are not limited to MOSFETs. For example, the switching elements 11*a* to 11*f* may be IGBTs. Alternatively, the switching elements 11*a* to 11*f* may be bipolar junction transistors (BJTs).

Various materials such as silicon (Si), silicon carbide (SiC) or gallium nitride (GaN) may be used as a semiconductor of which the switching elements 11*a* to 11*f* are made.

Some embodiments are described above but the embodiments are presented as examples and not intended to limit the scope of the embodiments. The embodiments may be performed in other various forms and provided with various kinds of omission, replacement, change, and combination without departing from the gist of the embodiments. The embodiments and modifications thereof are included in the scope and gist of the embodiments and also included in the claims and equivalents thereof.

The embodiments may be configured as described below.

[1] (Embodiment 1, Embodiment 2, and Embodiment 3)

An electronic circuitry comprising:

a current output circuit configured to output a drive current to a switching element;

a first detection circuit configured to detect a timing at which a voltage between output terminals of the switching element starts to change; and a control circuit configured to cause the current output circuit to start outputting a first drive current in accordance with a command signal that instructs switching operation of the switching element, in which the control circuit switches the drive current output from the current output circuit to a second drive current smaller than the first drive current based on the timing at which the voltage between the output terminals start to change, the timing being detected by the first detection circuit.

[2] (Embodiment 1)

The electronic circuitry according to 1, wherein when the timing at which the voltage between the output terminals starts to change is detected by the first detection circuit, the control circuit switches the drive current output from the current output circuit to the second drive current.

[3] (Embodiment 1)

The electronic circuitry according to 1 or 2, wherein the first detection circuit detects the timing at which the voltage between the output terminals starts to change, by detecting a timing at which the voltage between the output terminals of the switching element becomes equal to a predetermined first threshold voltage.

[4] (Embodiment 1)

The electronic circuitry according to 3, wherein the first threshold voltage is set between 90% to 80% of the voltage between the output terminals when the switching element is OFF.

[5] (Embodiment 1)

The electronic circuitry according to any one of 2 to 4, further comprising a second detection circuit configured to detect a timing at which the voltage between the output terminals of the switching element has stopped changing, wherein when the timing at which the voltage between the output terminals has stopped changing is detected by the second detection circuit, the control circuit switches the drive current output from the current output circuit to a third drive current larger than the second drive current.

[6] (Embodiment 1)

The electronic circuitry according to 5, wherein the second detection circuit detects the timing at which the voltage between the output terminals has stopped changing, by detecting a timing at which the voltage between the output terminals of the switching element becomes equal to a predetermined second threshold voltage.

[7] (Embodiment 1)

The electronic circuitry according to 6, wherein the second threshold voltage is set between 20% to 10% of the voltage between the output terminals when the switching element is OFF.

[8] (Embodiment 2 and Embodiment 3)

The electronic circuitry according to 1 further comprising:

a second detection circuit configured to detect a timing at which the voltage between the output terminals of the switching element has stopped changing; and a measurement circuit configured to measure a third time period from when the voltage between the output terminals starts to change is detected by the first detection circuit to when the the voltage between the output terminals has stopped changing is detected by the second detection circuit, wherein when a first time period has passed after the current output circuit starts outputting the first drive current, the control circuit switches the drive current output from the current output circuit from the first drive current to the second drive current and causes the current output circuit to output the second drive current for a second time period, and the control circuit corrects the value of the first time period based on the third time period measured by the measurement circuit.

[9] (Embodiment 2 and Embodiment 3)

The electronic circuitry according to 8, wherein the control circuit extends the first time period by a predetermined time period when the difference between the second time period and the third time period is larger than zero, and the control circuit shortens the first time period by the predetermined time period when the difference between the second time period and the third time period is equal to or smaller than zero.

[10] Embodiment 3

The electronic circuitry according to 8 or 9, wherein the control circuit corrects the value of the second drive current based on the third time period.

[11] Embodiment 3

The electronic circuitry according to 10, wherein the control circuit decreases the second drive current when the third time period is shorter than a predetermined target time period, and the control circuit increases the second drive current when the third time period is longer than the target time period.

[12]

An electric power conversion device comprising:

two switching elements constituting an arm pair; and two electronic circuitry configured to supply drive currents to the two switching elements respectively, wherein each of the electronic circuitry comprises:

a current output circuit configured to output a drive current to the switching element, a first detection circuit configured to detect a timing at which a voltage between output terminals of the switching element starts to change, and a control circuit configured to cause the current output circuit to start outputting a first drive current in accordance with a command signal that instructs switching operation of the switching element, and wherein the control circuit switches the drive current output from the current output circuit to a second drive current smaller than the first drive current based on the timing at which the voltage between the output terminals starts to change, the timing being detected by the first detection circuit.

[13]

An inverter comprising an electric power conversion circuit including three sets of two switching elements and two electronic circuitries, the two switching elements constituting an arm pair connected to a load, the two electronic circuitry being configured to supply drive currents to the two switching elements respectively, wherein each of the electronic circuitry comprises:

a current output circuit configured to output a drive current to the switching element, a first detection circuit configured to detect a timing at which a voltage between output terminals of the switching element starts to change, and a control circuit configured to cause the current output circuit to start outputting a first drive current in accordance with a command signal that instructs switching operation of the switching element, and wherein the control circuit switches the drive current output from the current output circuit to a second drive current smaller than the first drive current based on the timing at which the voltage between the output terminals starts to change, the timing being detected by the first detection circuit.

The invention claimed is:

1. An electronic circuitry comprising:

a current output circuit configured to output a drive current to a control terminal of a switching element;

a first detection circuit configured to detect a timing at which a voltage between output terminals of the switching element becomes equal to a predetermined first threshold voltage; and a control circuit configured to cause the current output circuit to start outputting a first drive current to the control terminal in accordance with a command signal that instructs switching operation of the switching element, wherein the control circuit switches the drive current output from the current output circuit to a second drive current smaller than the first drive current in response to the timing being detected by the first detection circuit, wherein the output terminals are different from the control terminal.

2. The electronic circuitry according to claim 1, wherein when the timing at which the voltage between the output terminals starts to change is detected by the first detection circuit, the control circuit switches the drive current output from the current output circuit to the second drive current.

3. The electronic circuitry according to claim 1, wherein the first threshold voltage is set between 90% to 80% of the voltage between the output terminals when the switching element is OFF.

4. The electronic circuitry according to claim 2, further comprising a second detection circuit configured to detect a timing at which the voltage between the output terminals of the switching element has stopped changing, wherein when the timing at which the voltage between the output terminals has stopped changing is detected by the second detection circuit, the control circuit switches the drive current output from the current output circuit to a third drive current larger than the second drive current.

5. The electronic circuitry according to claim 4, wherein the second detection circuit detects the timing at which the voltage between the output terminals has stopped changing, by detecting a timing at which the voltage between the output terminals of the switching element becomes equal to a predetermined second threshold voltage.

6. The electronic circuitry according to claim 5, wherein the second threshold voltage is set between 20% to 10% of the voltage between the output terminals when the switching element is OFF.

7. The electronic circuitry according to claim 1, further comprising:

a second detection circuit configured to detect a timing at which the voltage between the output terminals of the switching element has stopped changing; and a measurement circuit configured to measure a third time period from when the voltage between the output terminals starts to change is detected by the first detection circuit to when the voltage between the output terminals has stopped changing is detected by the second detection circuit, wherein when a first time period has passed after the current output circuit starts outputting the first drive current, the control circuit switches the drive current output from the current output circuit from the first drive current to the second drive current and causes the current output circuit to output the second drive current for a second time period, and the control circuit corrects the value of the first time period based on the third time period measured by the measurement circuit.

8. The electronic circuitry according to claim 7, wherein the control circuit extends the first time period by a predetermined time period when the difference between the second time period and the third time period is larger than zero, and the control circuit shortens the first time period by the predetermined time period when the difference between the second time period and the third time period is equal to or smaller than zero.

9. The electronic circuitry according to claim 7, wherein the control circuit corrects the value of the second drive current based on the third time period.

10. The electronic circuitry according to claim 9, wherein the control circuit decreases the second drive current when the third time period is shorter than a predetermined target time period, and the control circuit increases the second drive current when the third time period is longer than the target time period.

11. An electric power conversion device comprising:

two switching elements constituting an arm pair; and two electronic circuitry configured to supply drive currents to the two switching elements respectively, wherein each of the electronic circuitry comprises:

a current output circuit configured to output a drive current to a control terminal of the switching element, a first detection circuit configured to detect a timing at which a voltage between output terminals of the switching element becomes equal to a predetermined first threshold voltage, and a control circuit configured to cause the current output circuit to start outputting a first drive current to the control terminal in accordance with a command signal that instructs switching operation of the switching element, and wherein the control circuit switches the drive current output from the current output circuit to a second drive current smaller than the first drive current in response to the timing being detected by the first detection circuit, wherein the output terminals are different from the control terminal.

12. An inverter comprising an electric power conversion circuit including three sets of two switching elements and two electronic circuitries, the two switching elements constituting an arm pair connected to a load, the two electronic circuitry being configured to supply drive currents to the two switching elements respectively, wherein each of the electronic circuitry comprises:

a current output circuit configured to output a drive current to a control terminal of the switching element, a first detection circuit configured to detect a timing at which a voltage between output terminals of the switching element becomes equal to a predetermined first threshold voltage, and a control circuit configured to cause the current output circuit to start outputting a first drive current to the control terminal in accordance with a command signal that instructs switching operation of the switching element, and wherein the control circuit switches the drive current output from the current output circuit to a second drive current smaller than the first drive current in response to the timing being detected by the first detection circuit, wherein the output terminals are different from the control terminal.

* * * * *